(12) United States Patent
Dawson et al.

(10) Patent No.: US 9,218,199 B2
(45) Date of Patent: Dec. 22, 2015

(54) IDENTIFYING THREAD PROGRESS INFORMATION BY MONITORING TRANSITIONS BETWEEN INTERESTING STATES

(71) Applicant: International Business Machines Corporation, Armonk, NY (US)

(72) Inventors: Michael H. Dawson, Ottawa (CA); Trent A. Gray-Donald, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/684,457

(22) Filed: Nov. 23, 2012

(65) Prior Publication Data
US 2013/0139167 A1 May 30, 2013

(30) Foreign Application Priority Data

Nov. 24, 2011 (CA) ...................................... 2759365

(51) Int. Cl.
*G06F 9/44* (2006.01)
*G06F 9/46* (2006.01)
*G06F 11/34* (2006.01)

(52) U.S. Cl.
CPC .............. *G06F 9/46* (2013.01); *G06F 11/3423* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| 7,689,989 B2 | 3/2010 | Dostert et al. |
| 7,739,675 B2 | 6/2010 | Klein |
| 7,941,703 B2 | 5/2011 | Grodnik et al. |
| 2007/0106879 A1* | 5/2007 | Tanaka .......................... 712/214 |
| 2010/0070552 A1 | 3/2010 | Parker et al. |

OTHER PUBLICATIONS

Reiss, Efficient Monitoring and Display of Thread State in Java, Program Comprehension, May 2005, 13th International Workshop on Program Comprehension, pp. 247-256.*
Sewon Moon and Byeong-Mo Chang, "A Thread Monitoring System for Multithreaded Java Programs", ACM SIGPLAN Notices, vol. 41 (5), May 2006, pp. 21-29.

* cited by examiner

*Primary Examiner* — Abdullah Al Kawsar
*Assistant Examiner* — Melissa Alfred
(74) *Attorney, Agent, or Firm* — Cantor Colburn LLP

(57) ABSTRACT

Embodiments relate to a method, apparatus and program product and for capturing thread specific state timing information. The method includes associating a time field and a time valid field to a thread data structure and setting a current time state by determining a previous time state and updating it according to a previously identified method for setting time states. The method further includes determining status of a time valid bit to see if it is set to valid or invalid. When the status is valid, it is made available for reporting.

7 Claims, 9 Drawing Sheets

IDENTIFYING THREAD PROGRESS INFORMATION BY MONITORING TRANSITIONS BETWEEN INTERESTING STATES

PRIORITY

The present application claims priority to Canadian application number (CA) 2759365 filed Nov. 24, 2011 and all benefits accruing therefrom under U.S.C. §119, the contents of which are incorporated herein in its entirety.

BACKGROUND

This disclosure relates generally to timing information in a data processing system and more specifically to timing information associated with identification of thread progress information.

Existing computational environments, including Java® virtual machines, capture and allow users to observe a wealth of information describing a current state of a process as the process executes. This information is available through console output, output to files, javacores (text files containing diagnostic information related to the virtual machine and a Java application captured at a point during execution), snapshots of a process (core files), JVMTI (a programming interface for use by tools, providing a way to inspect a state and to control execution of a process) and monitoring and diagnostic tools readily available. The state information often includes information about threads and whether the threads are blocked waiting on a monitor, sleeping, running in a native, running Java code as well as other conditions.

Information relevant to describing state and state related information as the threads execute over time is not available to correctly inform an observer. Accordingly misconceptions regarding a thread may be made and resulting actions may be incorrect.

BRIEF SUMMARY

Embodiments include a method, system, and computer program product for capturing thread specific state timing information. The method includes associating a time field and a time valid field to a thread data structure and setting a current time state by determining a previous time state and updating it according to a previously identified method for setting time states. The method further includes determining status of a time valid bit to see if it is set to valid or invalid and when the status is valid, it is made available for reporting. In another embodiment, The time field will be updated when the status is set to invalid. The updating is performed by calculating according to the previously identified method for setting time states, an obtained value for the time valid bit. Once the updating is completed, the time valid field is reset to a VALID status and the entry for time field is made available for reporting Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
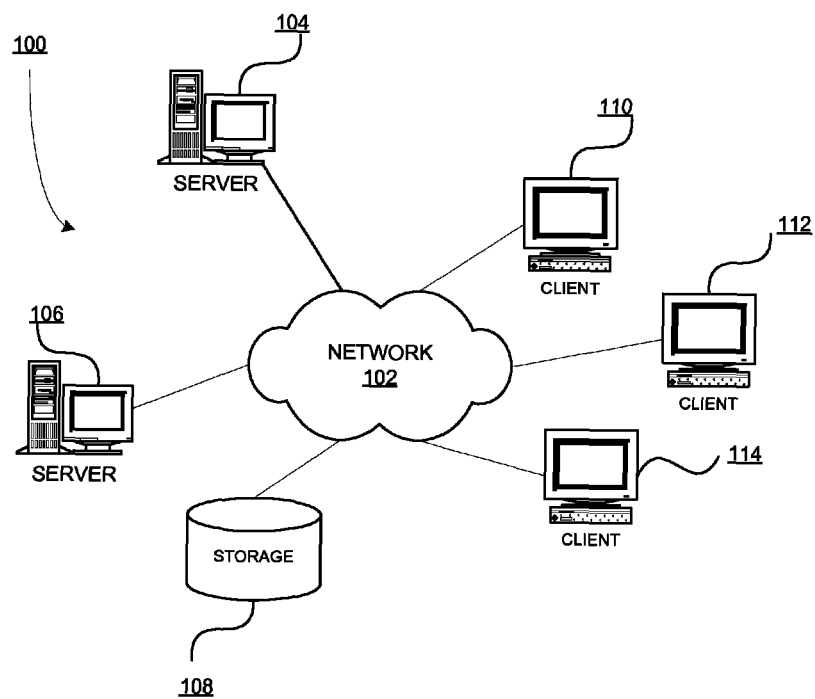
FIG. 1 is a block diagram illustration of an exemplary network data processing system operable for various embodiments of the disclosure.
Figure 2:
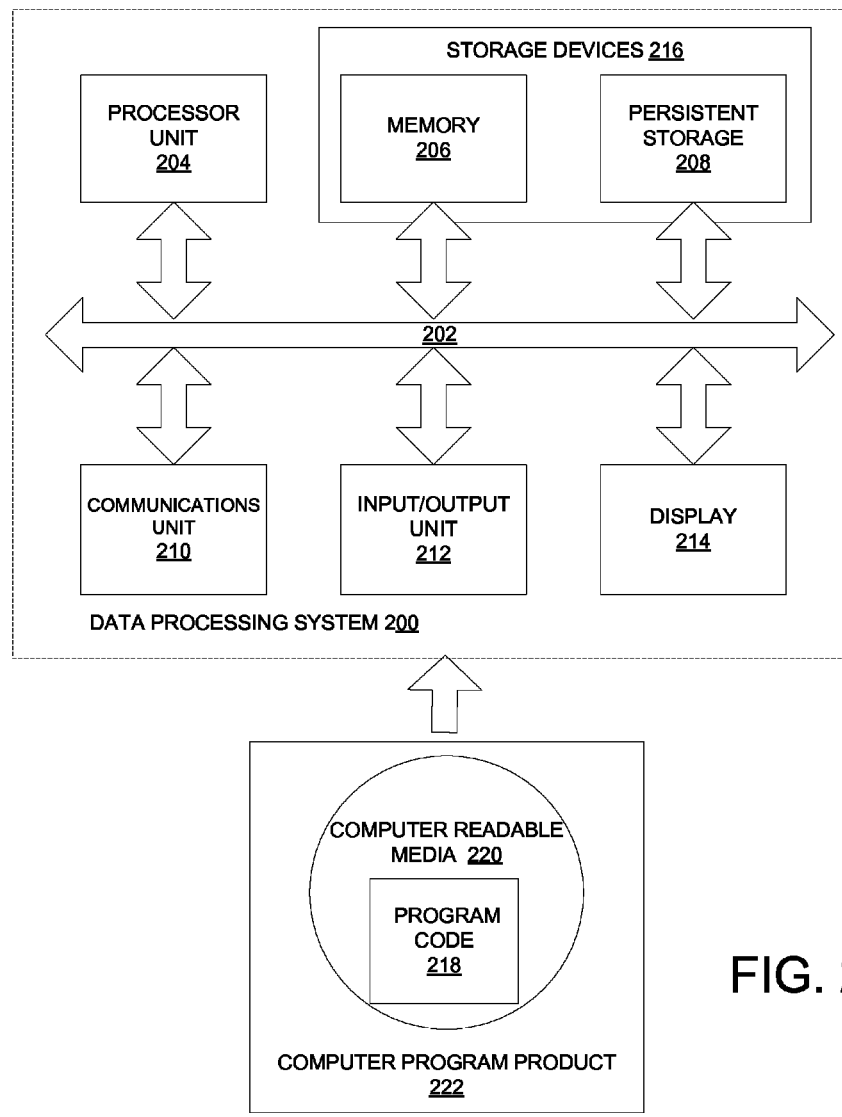
FIG. 2 is a block diagram illustration of an exemplary data processing system operable for various embodiments of the disclosure.

FIG. 1 depicts a pictorial representation of a network of data processing systems in which illustrative embodiments may be implemented. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data program code in functional form, and/or other suitable information either on a temporary basis and/or a permanent basis. Memory 206, in these examples, may be, for example (beginning of this sentence a little choppy, maybe "In these examples, memory 206 may be, for example,"), a random access memory or any other suitable volatile or non-volatile storage device. Persistent storage 208 may take various forms depending on the particular implementation. For example, persistent storage 208 may contain one or more components or devices. For example, persistent storage 208 may be a hard drive(maybe change to "Persistant storage 208 may be, for example,", a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for capturing thread specific state timing information is presented. Processor unit 204 adds a time field and a time valid field to a thread data structure to form an enhanced thread in storage devices 216. Processor unit 204 identifies a method used to set the time field of the thread to form an identified method and determines whether a time valid bit is currently set to a value representing INVALID for the thread. Responsive to a determination that the time valid bit is currently set to the value representing INVALID for the thread, processor unit 204 sets the time field of the thread to an obtained value according to the identified method, and sets the time valid field of the thread to a value representing VALID. Processor unit 204 makes the time field value available for reporting.

Processor unit 204 determines whether a phase exit from an interesting state occurs. Responsive to a determination that the phase exit from the interesting state occurs, processor unit 204 invalidates time of the thread to set the time valid field to a value representing INVALID. Processor unit 204 further makes the time field value available for reporting.

The computer-implemented process adds a time field and a time valid field to a thread data structure to form an enhanced thread, identifies a method used to set the time field of the thread to form an identified method. Responsive to a determination that the time valid bit is currently set to the value representing INVALID for the thread, the computer-implemented process sets the time field of the thread to an obtained value according to the identified method, sets the time valid field of the thread to a value representing VALID and makes the time field value available for reporting. Responsive to a determination that the phase exit from the interesting state occurs, the computer-implemented process invalidates time of the thread to set the time valid field to a value representing INVALID. Processor unit 204 makes the time field value available for reporting.

Figure 3:
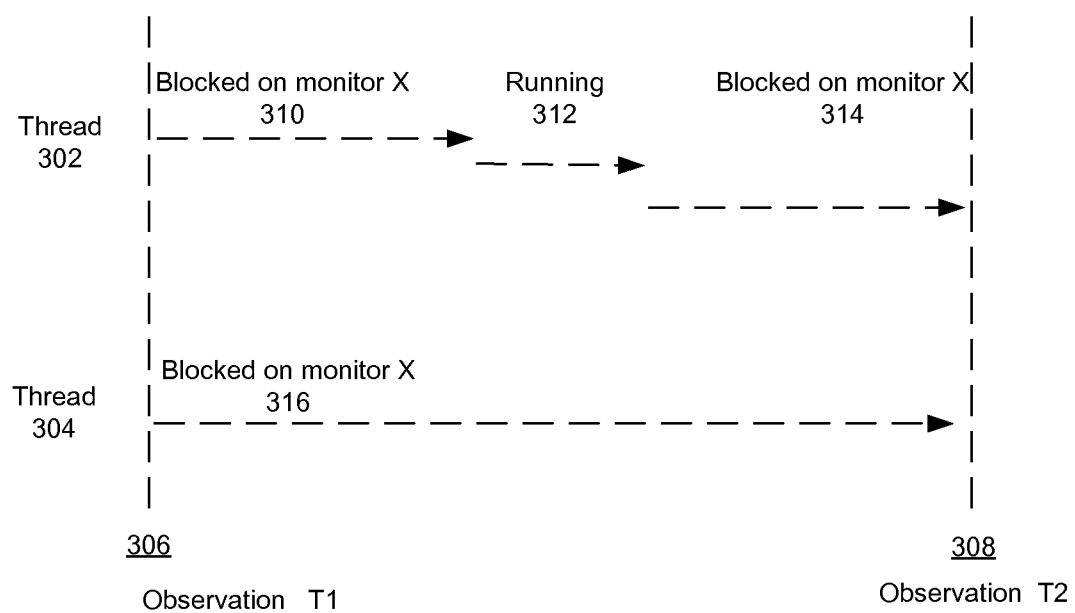
FIG. 3 is a schematic diagram representation of observing processing of two threads operable for various embodiments of the disclosure.

Current tools, however, do not provide information on how long a thread has been in a state and whether the state has remained constant since a last observation. With reference to FIG. 3, a schematic representation of observing processing of two threads is presented. FIG. 3 is only provided to enable an understanding of the general concepts behind this process. During observation window 300 thread 302 and thread 304 are observed at intervals of observation 306 at time T1, and observation 308 at time T2. During the period between observations, thread 302 passes through states of blocked on monitor X 310, running 312 and blocked on monitor X 314. During the same interval thread 304 remains in a state of blocked on monitor X 316. The state of the threads in the example of FIG. 3 would appear to be the same as when observed at T1 and T2.

Figure 4:
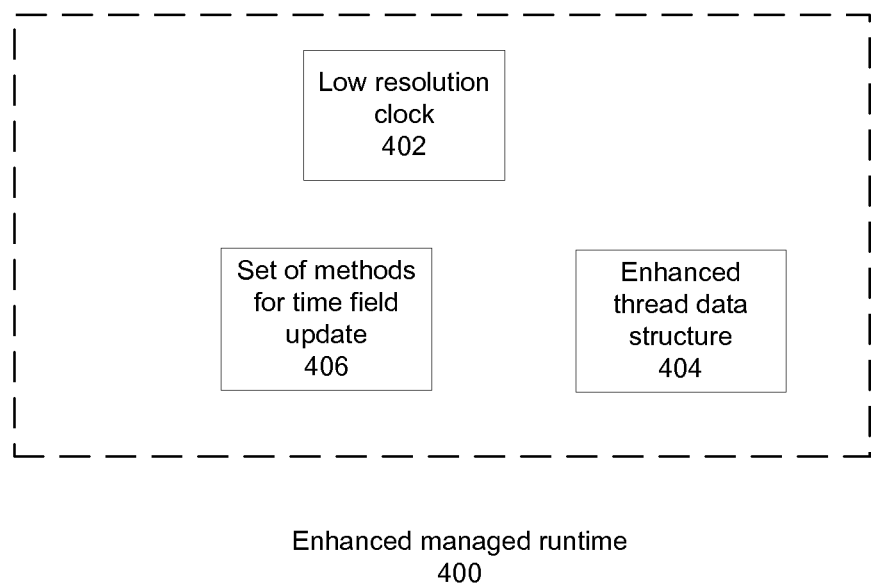
FIG. 4 is a block diagram illustration of an enhanced managed runtime in accordance with one embodiment of the disclosure.

With reference to FIG. 4 a block diagram of an enhanced managed runtime in accordance, with various embodiments of the disclosure is presented. Enhanced managed runtime 400 is an example of a managed runtime having been updated to use the disclosed subject matter. In an example a Java virtual machine is used as an illustrative embodiment, but the example is not meant to be limited to the specific implementation of the illustration. Other managed runtimes and operating system environments are equally suited to implementations of the disclosed subject matter.

Enhanced managed runtime 400 leverages support of an underlying system such as data processing 200 of FIG. 2 or a network of data processing system such as network of data processing systems 100 of FIG. 1. Enhanced managed runtime 400 includes a number of function components, which may be implemented separately or in various combinations as required, comprising a low resolution clock 402, an enhanced thread data structure 404 and set of methods for time field update 406.

Low-resolution clock 402 is a global low-resolution clock maintained by and within enhanced managed runtime 400. The clock is updated at a relatively long interval by the enhanced managed runtime using a hardware or operating system clock as a base. The relatively long interval enables a degree of precision needed for monitoring and reporting while reducing cost of frequent updates from a base clock of a system, such as a hardware or operating system clock. Although timing accuracy may be reduced effectiveness is attained through data capture that would otherwise be lost.

Enhanced thread data structure 404 provides a capability to store timing information on a thread basis. Fields are added to a typical thread data structure in the form of a time field and time valid field. The time represents an estimate of the time at which a thread entered an interesting state. The time valid field contains a value representing either VALID, indicating the time is valid for the current thread and should not be updated until the thread leaves the current state and INVALID, indicating the thread is not in an interesting state or the field has not been set since the thread entered the state.

Set of methods for time field update 406 provides a number of selectable methods from which a method is identified for use in setting of the time field of enhanced thread data structure 404. An example set of methods is disclosed, but the examples may be modified as required. A selected method may be a single method or a combination of methods.

Figure 5:
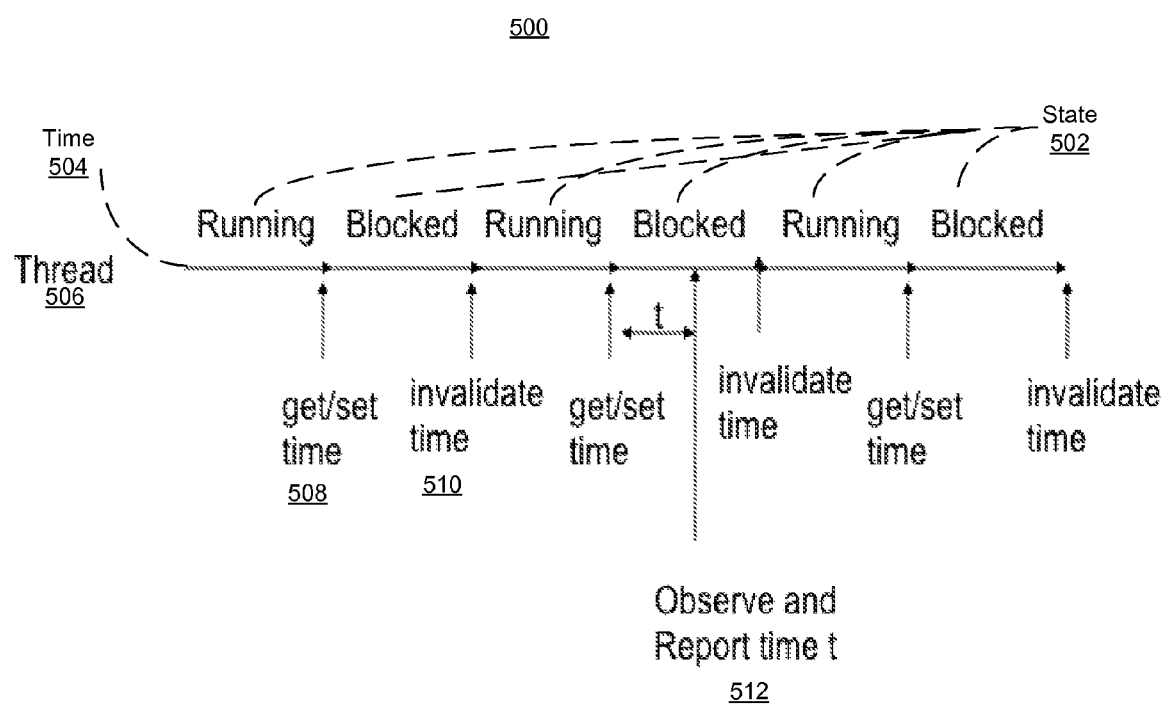
FIG. 5 is a schematic diagram illustrating capturing state timing information in accordance with one embodiment of the disclosure.

With reference to FIG. 5 a schematic diagram of capturing state timing information is presented. Thread sequence 500 is an example of a current obvious way of capturing state timing information which records the time when a thread enters a particular state and then reports the delta between this time and an observation time.

A sequence of states represented as state 502 depicts alternate states in which thread 506 traverses during time 504. For example as thread 506 leaves a running state, get/set time 508 occurs. When thread 506 leaves a blocked state, invalidate time 510 occurs. This set of operations each repeated alternately for each state change in the sequence.

Observe and report time t 512 indicates an instant at which a time value is reported when thread 506 is in a blocked state for a duration t. However, this approach will be unacceptable due to additional overhead of getting timing information, which is often relatively expensive, and the frequency at which timing information would have to be captured. For example if thread 506 enters/exits a monitor 1,000,000 times per second the overhead of getting the time on each enter would be prohibitive because the time would be obtained 1,000,000 times a second even when the state of a thread is observed every 10 seconds.

Figure 6:
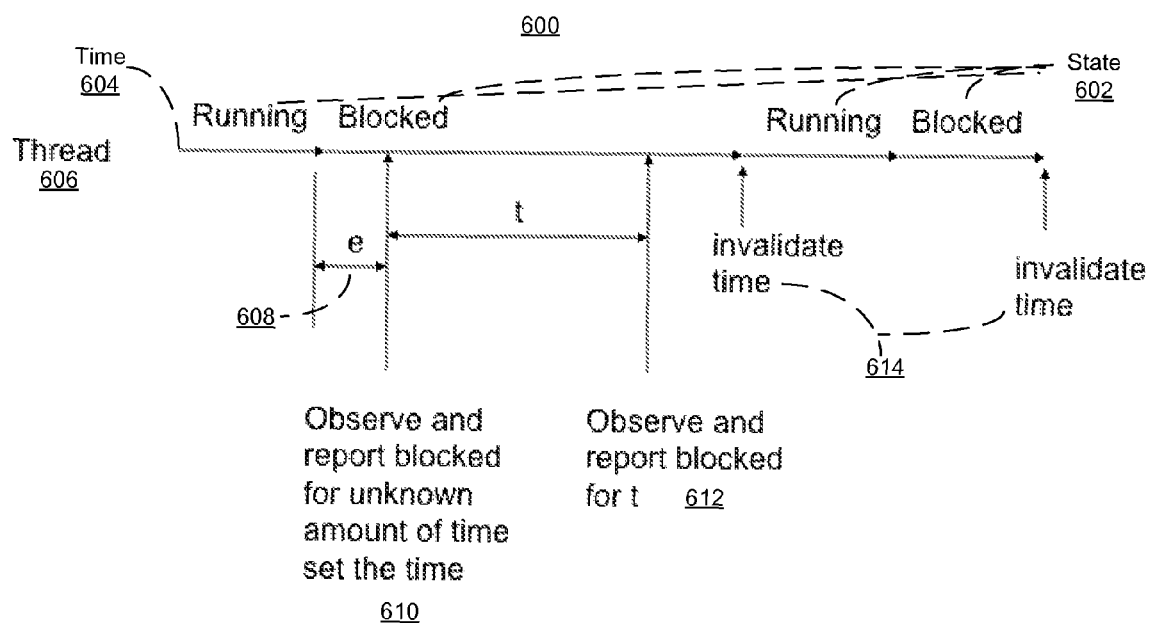
FIG. 6 is a schematic diagram illustrating capturing state timing information using an external observation in accordance with one embodiment of the disclosure.

With reference to FIG. 6 a schematic diagram of capturing state timing information using an external observation in accordance with an illustrative embodiment of the disclosure is presented. Thread sequence 600 is an example of an external observation of a thread state and the thread is in an interesting state. Interesting states are defined by a requester of the state information and comprise selected states of thread in a managed runtime typically including running, parked, and blocked.

Embodiments of the disclosure associate a time with threads in interesting states without requiring such a time to always be available even when the thread is in an interesting state, nor for time to be captured when the thread enters the state. The accuracy of the time reported for a duration a thread has been in a state will be reduced, but most often interest is in threads that are in a state for longer times so the reduced accuracy is acceptable and does not affect the utility of capturing the information.

As shown in FIG. 4, in addition to associating a time field with a thread a time valid field is also used. When the time valid field is represented as VALID the time is valid for the associated thread and should not be updated until the thread leaves the current state. When the time valid field is represented as INVALID then either the thread is not in an interesting state or it has not been set since the thread has entered that state.

As presented in thread sequence 600 the time valid field is set to INVALID each time a thread leaves one of the states of interest and the time valid field is set to VALID when there is an external observation of thread state and the thread is in an interesting state and the time valid field is set to INVALID.

State 602 represents a set of alternating states of running and blocked states in this example. Time 604 represents a time period over which the state changes of thread 606 occur. Interval e 608 represents a time period for which thread 606 was blocked but time was not available or captured. Observe and report blocked for unknown amount of time and set the time 610 represents an awareness of the unknown time and the setting of the time field of the thread.

A time t passes, having set the time field of the thread and an observation is made in the form of observe and report blocked for t 612 occurs. As thread 606 continues the thread moves from the previously blocked state into running at which time invalidate time 614 occurs and again after a subsequent blocked state expires. The resulting error is an amount of time defined by interval e 608. The error is typically acceptable given the alternative cost of obtaining more precise timing information.

Figure 7:
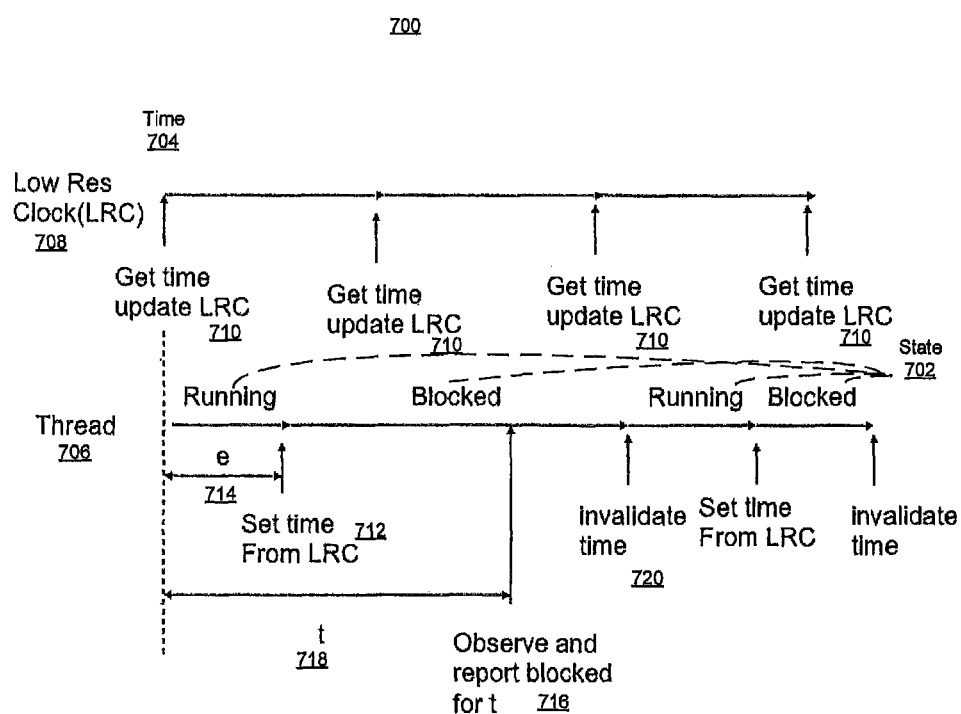
FIG. 7 is a schematic diagram illustrating capturing state timing information using a low-resolution clock in accordance with one embodiment of the disclosure.

With reference to FIG. 7 a schematic diagram of capturing state timing information using a low-resolution clock in accordance with an illustrative embodiment of the disclosure is presented. Thread sequence 700 is an example of capturing state timing information using a low-resolution clock in the timing of a thread state and when the thread is in an interesting state. For example, using a low-resolution clock value cached within the managed runtime of a Java virtual machine each time the thread enters a state of interest.

State 702 represents a sequence of states through which thread 706 passes over time 704. Low Res clock (LRC) 708 represents a low-resolution clock maintained within the managed runtime in which thread 706 executes. Low Res clock (LRC) 708 is updated according to a frequency indicated by get time update LRC 710 (occurs 4 times in the example) relative to time 704 and state 702.

Get time update LRC 710 first occurs while thread 706 is running An interval e 714 is defined for execution of thread 706 when thread 706 exits the running state, by a difference between get time update LRC 710 and set time from LRC 712. However the thread time was set based on a previous value of Low Res clock (LRC) 708. Thread 706 progresses through a blocked state and exits causing occurrence of observe and report blocked for t 716. The observed and report interval of t 718 includes a portion of time in which thread 796 was running but the value of Low Res clock (LRC) 708 was not synchronized with the exit of the running stage. The resulting error is an amount defined by interval e 714. The error is typically acceptable given the alternative cost of more precise timing.

Thread 706 exits a blocked state causing operations of invalidate time 720, to occur. Each state change for thread 706 is accordingly monitored resulting in a setting of time or invalidating time when already set as well as observing and monitoring steps.

Figure 8:
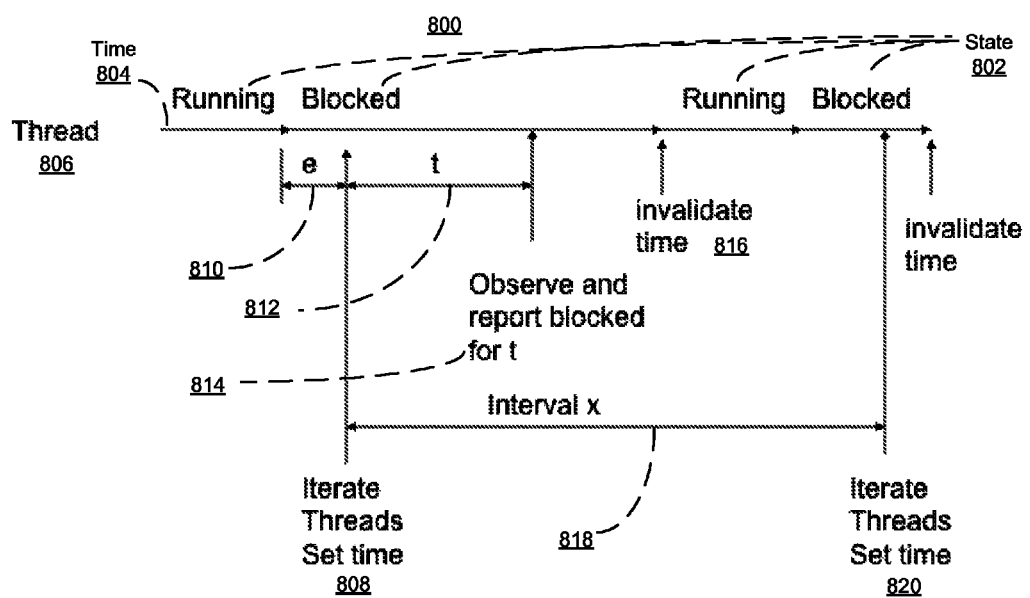
FIG. 8 is a schematic diagram illustrating capturing state timing information using a periodic iteration in accordance with one embodiment of the disclosure.

With reference to FIG. 8 a schematic diagram of capturing state timing information using a periodic iteration in accordance with an illustrative embodiment of the disclosure is presented. Thread sequence 800 is an example of capturing state timing information by periodically iterating through the threads in an interesting state to set the time field of the respective threads.

Time 804 defines a time period through which thread processing occurs. In this example thread 806 is processed through a series of states defined by state 802. Entry and exit points for a state are known. A point is established when iterate threads set time 808 occurs during a blocked state period of thread 806. An interval is defined as the time between the entrance to the blocked state and iterate threads set time 808, as interval e 810. This interval represents a gap in the timing information and is typically acceptable in view of the cost of gathering more precise information.

Time progresses and observe and report blocked for t 814 occurs, defining an interval t 812 as a time period between iterate threads set time 808 and observe and report blocked for t 814. In this example, interval e 810 is not included because iterate threads set time 808 was established as a starting point for time observation. The resulting error is an amount of time defined by interval e 810. The error is typically acceptable given the alternative cost of obtaining more precise timing information.

Iterate threads set time 808 defines a starting point for time of one interval, while a successive iterate threads set time 820 defines a starting point for another time interval, defined as interval x 818. During this interval invalidate time 816 occurs at the transition from blocked to running for thread 806. In this case the time field of thread 806 was valid was not updated until the thread left the current state of blocked.

Using the examples of FIG. 5 through FIG. 8 the disclosed technique provides a capability of selectively choosing a method or combination of methods for setting the time fields typically providing no overhead when a state of threads is not being observed, a reduction in a number of times used to obtain the current time, less overhead than previous methods when only a small number of threads are in an interesting state for long periods, bounded overhead even when threads transition to/from interesting states rapidly in a number of threads and fewer threads accessing or attempting to access a shared time value (whether time value is retrieved from the operating system or is cached).

However an error typically occurs in the time reported (interval e in the examples) using the methods of the examples, but as the time in a blocked state (for example) increases this error will become less significant with respect to the amount of blocked time (t), and typically cases involving states of interest are cases in which (t) is a long time.

Figure 9:
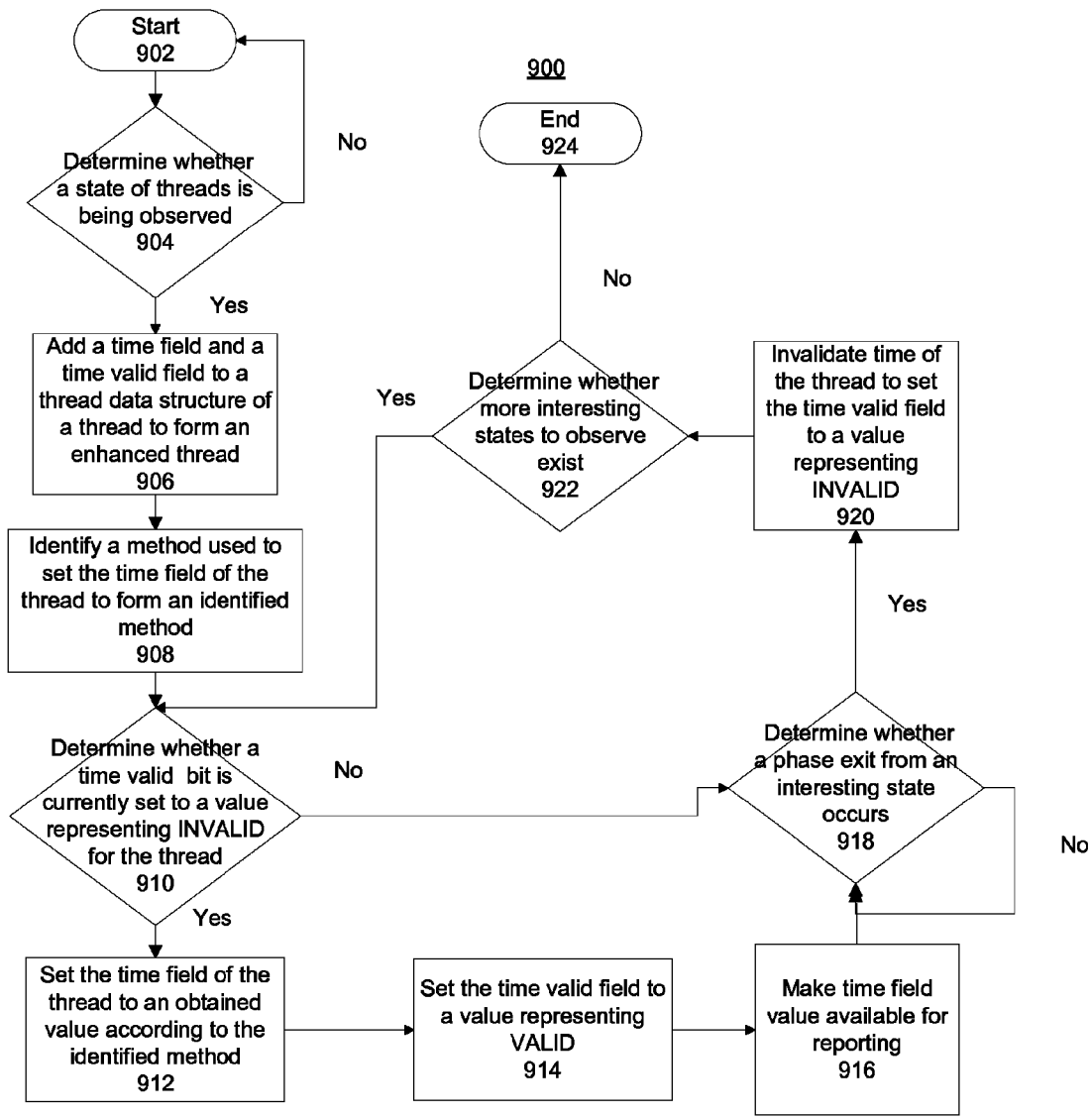
FIG. 9 is a flowchart of process illustrating capturing thread specific state timing information in accordance with an illustrative embodiment of the disclosure.

With reference to FIG. 9 a flowchart of process for capturing thread specific state timing information in accordance with an illustrative embodiment of the disclosure is presented. Process 900 is an example of capturing thread specific state timing information using enhanced managed runtime 400 of FIG. 4. Process 900 captures thread specific state timing information for threads in an interesting state using a time field and a time valid field of a respective thread.

Process 900 begins (step 902) and determines whether a state of threads is being observed (step 904). When a determination is made that a state of threads is not being observed, nothing more needs to be done and process 900 loops back to step 902. When a determination is made that a state of threads is being observed, process 900 adds a time field and time valid field to a thread data structure of a thread to form an enhanced thread (step 906). The enhanced thread data structure is managed within an enhanced managed runtime, for example an enhanced thread data structure as in an enhanced Java virtual machine thread structure. The time field contains a value that represents an estimate of the time at which the thread entered a current interesting state.

Process 900 identifies a method used to set the time field of the thread to form an identified method (step 908). The method is identified from a set of predefined methods whereby the time field can be set with minimal overhead. Regardless of the identified method, there are instances where an update of the time field within the thread is made.

A set of methods from which an identified method is a member includes (but is not limited to) a method of iterating a list of threads at each major observation point (for example when there is a request to generate a javacore) and setting the time field when appropriate. This limits a need to obtain the time to once per observation and causes the duration reported to be the time in the state so far (the difference between the time the thread entered the state and the time the thread was first observed in that state). This timing is sufficiently accurate to identify whether the thread has changed state between observations and to identify threads that stay in a same state across a number of observations.

In another example, a method incorporates addition of a global, low-resolution clock value stored within the enhanced managed runtime, such as a Java virtual machine. The global, low-resolution clock is updated at a relatively long interval by the virtual machine (for example, 10 times per second) and each time a thread enters an interesting state the method sets the time field and the time valid field to a value representing VALID. The method enables obtaining a current time at a much lower frequency, while being able to report a duration, a thread was in a given state to the resolution provided by the low-resolution clock value stored within the virtual machine. A cost of using this method is that every time a thread enters an interesting state the method has to access and copy the low-resolution clock.

In another example, a method incorporates addition of a separate thread which runs at a relatively long interval by the enhanced managed runtime (for example, 10 times a second) and each time the method is executed the method walks the threads which are currently in an interesting state and sets the time field as appropriate. Using this method incurs minimal cost when there are no threads in an interesting state and obtaining the current time is completely avoided. When there are threads in an interesting state the cost of using the method varies depending on a number of threads. Using the described method enables reporting on a duration the thread has been in a given state with the same resolution at which a separate thread runs.

In another example, using the method incorporating addition of a separate thread wherein only a subset of the threads is updated in each interval such that over N intervals all threads are updated. This variation of the previous method reduces accuracy but bounds the overhead at each interval while ensuring that those threads, which remain in a state for an extended time period, are still identified. This variation typically limits overhead to clearing a validity bit as previously described and a bounded amount of overhead in each interval.

In another example, a method observes a state for a specific thread externally and the state is an interesting state. In this variation of incorporating a global, low-resolution clock the low-resolution clock is pushed into individual threads to avoid many threads trying to access a single copy of the cached low-resolution time.

Other examples form various combinations of the previously described methods to control overhead while providing a predetermined minimum accuracy. For example using a method of iterating a list of threads and a global, low-resolution clock where the low-resolution clock is only updated every 2 minutes. This method would typically provide accurate information when observations are frequent while at the same time providing information accurate to 2 minutes when observations are very infrequent.

Each of the previously described methods offers particular features. For example a method using a global, low-resolution clock does not require overhead of walking a thread list, however, the method may require more threads to access a consistent view of the low resolution clock leading to additional overhead associated with the numerous threads accessing the same clock value. Methods which require walking a list of threads, may not be too inefficient because only one or two threads may ever access the time value and the time values on the threads themselves (the thread setting the time and the thread gathering the times from the threads during an observation, which can be the same thread).

Selectable methods of the described process provide a capability to accommodate different methods for setting the time. In addition, regardless of the approach used, the described process is typically more efficient than previous attempts, which require capturing the current time every time a thread enters an interesting state.

Using the identified method, process 900 determines whether a time valid bit is currently set to a value representative of INVALID for the thread (step 910). When a determination is made that the time valid bit is currently set to a value representing INVALID, process 900 sets the time field of the thread to an obtained value according to the identified method step 912). The obtained value is a time value obtained or used by a respective identified method. For example, the time value may be a value obtained using a low-resolution clock or may be a time value representative of an observation, as shown in the previous example methods.

Process 900 sets the time valid field of the thread to a value representing VALID (step 914). Process 900 accordingly makes the time field value available for reporting (step 916). Availability to reporting is provided using application programming interfaces (APIs) and code through which observations can and are made. For example having the code, which generates the javacore, include the time field in the information provided as output for threads. Updates to the application programming interfaces (APIs) and code must ensure when the time valid field is INVALID the application programming interfaces (APIs) and code can handle these cases gracefully either by not displaying any information or by indicating the time was unknown.

When a determination is made that the time valid bit is currently set to a value not representing INVALID, process 900 (the time valid bit is accordingly VALID) skips ahead to step 918 and the time is not updated.

Process 900 determines whether a phase exit from an interesting state occurs (step 918). Careful definition of the enter/exit points for interesting states and setting the time valid field to "INVALID" at each exit point is required to maintain accuracy in time capture. For some threads and states the definition is relatively straightforward but for other examples it is not. Consider an example of a thread waiting on a monitor in which the enter point of a state is when the monitor enters the monitor and the exit is when the monitor exits the monitor. In another example, a thread running native code in which there is an enter point when the native is called and there is an exit point when the native finishes running There is also an exit point when the native makes certain callbacks available through the Java Native Interface (JNI). For example, CallVoidMethod, which runs the Java code in the specific method specified. There is an entry point when a callback completes and that callback has an exit point. For example, upon return from the CallVoidMethod. In this example careful identification of the enter/exit points is required with an understanding that what is interesting is not how long the overall native execution time is, but how long the native has been running since a last transition to the native from running Java code.

When a determination is made that the phase exit from the interesting state does not occur, process 900 loops back to perform step 918 as before. When a determination is made that the phase exit from the interesting state occurs, process 900 invalidates time of the thread to set the time invalid field to a value of INVALID (step 920). Process 900 makes the time field value available for reporting as before. Availability to reporting is provided using application programming interfaces (APIs) and code through which observations can and are made. For example having the code, which generates the javacore, include the time field in the information provided as output for threads. Updates to the application programming interfaces (APIs) and code must ensure when the time valid field is INVALID the application programming interfaces (APIs) and code can handle these cases gracefully either by not displaying any information or by indicating the time was unknown.

Process 900 determines whether more interesting states to observe exist (step 922). When a determination is made that more interesting states to observe exist, process 900 loops back to perform step 910 as before. When a determination is made that no more interesting states to observe exist, process 900 terminates (step 924).

Thus is presented in an illustrative embodiment a computer-implemented process for capturing thread specific state timing information. The computer-implemented process adds a time field and a time valid field to a thread data structure to form an enhanced thread, identifies a method used to set the time field of the thread to form an identified method and determines whether a time valid bit is currently set to a value representing INVALID for the thread.

Responsive to a determination that the time valid bit is currently set to the value representing INVALID for the thread, the computer-implemented process sets the time field of the thread to an obtained value according to the identified method, sets the time valid field of the thread to a value representing VALID, makes the time field value available for reporting and determines whether a phase exit from an interesting state occurs. Responsive to a determination that the phase exit from the interesting state occurs, the computer-implemented process invalidates time of the thread to set the time valid field to a value representing INVALID. The computer-implemented process further makes the time field value available for reporting.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method comprising:
   defining one or more interesting states for the thread in the thread data structure of the thread, wherein a phase exit point is defined for each of the one or more said interesting states;
   associating a time field and a time valid field with a thread data structure of a thread, wherein the time field comprises an estimate of a time at which the thread entered a current interesting state corresponding to one of the one or more defined interesting states, and wherein a status of the time valid field is set of one of valid and invalid;
   determining the status of the time valid field;
   based on the status of the time valid field being set to invalid:
      setting the time field;
      setting the time valid field to valid; and
      making the current time state in the time field available for reporting;
   based on the status of the time valid field being set to valid, making the current time state in the time field available for reporting; and based on a phase exit point of one of the one or more interesting states occurring in the thread, setting the time valid field to invalid, thereby making the current time state in the time field not available for reporting;
   wherein an error interval corresponding to an amount of time between a phase exit point occurring and setting of the time field is not included in the reporting of the time field.

2. The method of claim 1, wherein the time field is updated with the current time state of the thread using a time setting method that is selected from a set of predefined time setting methods for the thread.

3. The method of claim 2, wherein said set of predefined time setting methods includes:
   a time setting method that uses a low resolution clock value cached within a managed runtime each time a thread enters an interesting state; and
   a time setting method that uses periodic iteration through threads in an interesting state to set a time field.

4. The method of claim 1, further comprising,
   based on the status of the time valid field being set to valid, not updating the current time state of the thread in the time field, and waiting until the status of the time valid field is set to invalid to update the time field of the thread.

5. The method of claim 1, wherein based on said status of the time valid field being set to invalid, indicating that the time state of the thread is unknown by an application programming interface (API).

6. A computer program product for capturing thread specific state timing information, the computer program product comprising a non-transitory computer readable storage medium having computer readable program code embodied therewith, said computer readable program code being executable by a computer to:
    define one or more interesting states for the thread in the thread data structure of the thread, wherein a phase exit point is defined for each of the one or more said interesting states;
    associate a time field and a time valid field with a thread data structure of a thread, wherein the time field comprises an estimate of a time at which the thread entered a current interesting state corresponding to one of the one or more defined interesting states, and wherein a status of the time valid field is set of one of valid and invalid;
    determine the status of the time valid field;
    based on the status of the time valid field being set to invalid:
        set the time field;
        set the time valid field to valid; and
        make the current time state in the time field available for reporting;
    based on the status of the time valid field being set to valid, make the current time state in the time field available for reporting; and based on a phase exit point of one of the one or more interesting states occurring in the thread, set the time valid field to invalid, thereby making the current time state in the time field not available for reporting;
    wherein an error interval corresponding to an amount of time between a phase exit point occurring and setting of the time field is not included in the reporting of the time field.

7. An apparatus for capturing thread specific state timing information, the apparatus comprising:
    a communications fabric having a communications unit;
    a memory connected to the communications fabric, wherein said memory contains computer executable program code; and
    a processor unit connected to said communications fabric, wherein said processor unit is configured to execute a computer executable program code to:
        define one or more interesting states for the thread in the thread data structure of the thread, wherein a phase exit point is defined for each of the one or more said interesting states;
        associate a time field and a time valid field with a thread data structure of a thread, wherein the time field comprises an estimate of a time at which the thread entered a current interesting state corresponding to one of the one or more defined interesting states, and wherein a status of the time valid field is set of one of valid and invalid;
        determine the status of the time valid field;
        based on the status of the time valid field being set to invalid:
            set the time field;
            set the time valid field to valid; and
            make the current time state in the time field available for reporting;
        based on the status of the time valid field being set to valid, make the current time state in the time field available for reporting; and
        based on a phase exit point of one of the one or more interesting states occurring in the thread, set the time valid field to invalid, thereby making the current time state in the time field not available for reporting;
        wherein an error interval corresponding to an amount of time between a phase exit point occurring and setting of the time field is not included in the reporting of the time field.

* * * * *